_United States Patent Office_ 2,745,640
Patented May 15, 1956

2,745,640

HEAT EXCHANGING APPARATUS

John A. Cushman, Reedsville, Pa., assignor to American Viscose Corporation, Philadelphia, Pa., a corporation of Delaware Application September 24, 1953, Serial No. 382,104

1 Claim. (Cl. 257—2)

The present invention relates to improvements in heat exchanging equipment, particularly to apparatus in which a multiplicity of separate streams of fluid proceeding through separate ducts are to be subjected to substantially the same heating or cooling treatments.

For example, in the manufacture of regenerated cellulose yarn from viscose, a procedure in current use is to heat the viscose just prior to spinning. This is accomplished by extending the duct for supplying the viscose to a spineret through a heating medium disposed along the duct not far from the spinneret. Since the chemical structure of the viscose is dependent upon "ageing" to a great extent, and "ageing" is influenced primarily by time and temperature, it is essential that the time interval between the heating of the viscose and the extruding thereof into an acid spin bath be as short as possible in order that the chemical structure of the viscose may undergo as little change as possible after being heated, and be controlled with accuracy, to attain desired standards of quality in the yarn product thereof. One scheme that has been tried is to heat the viscose by submerging the supply duct of the spinneret in heated coagulant. When the viscose is heated by hot coagulant, the coagulant bath must be heated to higher temperatures than would be otherwise required and is quite hot to work around. When so heated, the bath discharges fumes, and is more wasteful of heat than when maintained at a lower temperature. Moreover, a considerable length of submerged viscose supply-duct is required for obtaining hot viscose. The maximum temperature of an open bath possible is approximately 100° C. which is well below that of a heating medium needed to obtain sufficient heat transfer rates permitting the construction of a compact heating system, particularly when viscose temperatures approaching 100° C. are desired.

Other systems adapted to substantially heat the viscose before extrusion that have been tried include external heaters disposed along the viscose supply lines, i. e., heaters which do not use the coagulant as a heat source, whether separate with respect to the viscose supplied to each spinneret, or adapted to heat a plurality of viscose supply ducts. In general, such heaters have been too far removed from the spinneret to provide accurate control of the chemical condition of the viscose as extruded from the spinneret.

It is, therefore, a primary object of the present invention to provide a heat-exchanging system adapted to heat or cool a large plurality of separate streams of fluid and comprising a readily replaceable heat-transfer unit or duct for handling each stream and adapted to be removed from such a system independently of the other units.

It is also an object to provide a heat-exchanging system, adapted to heat or cool a plurality of separate streams of fluid, capable of supporting a fluid-heating or cooling medium exteriorly of ducts through which such streams are circulated at super or sub-atmospheric pressure. Such a system will enable substantial differences of temperature to be developed between the streams within the ducts and the heating or cooling medium supported around the ducts whereby the heat transfer rate may be relatively high and thus short ducts may be used.

It is an object to provide a system for simultaneously heating the viscose supplied to a plurality of spinnerets along portions of respective supply lines disposed very close to the spinnerets.

An object ancillary to the last-named object is to provide a heating apparatus in which the duct portion thereof for handling viscose supplied to any single spinneret is readily and independently replaceable.

It is still another object to provide a viscose heating system which may be readily incorporated into existing rayon spinning machines without substantial modification. Other objects, features, and advantages will become apparent from the following description of the invention and the drawings relating thereto in which Fig. 1 is a fragmentary view of a spinning machine illustrating a portion of a heat exchanger incorporated therein in accordance with the present invention;

Fig. 3 is a top view of a removable unit of the heat-exchanger shown in Figs. 1 and 2;

Fig. 4 illustrates a portion of the heat exchanger header, with the unit portion shown in Fig. 3 removed therefrom;

The invention, in brief, provides heat-exchanging apparatus which comprises a hollow body or header having lateral openings, and a heat exchanging unit fitting into each of the openings, with each unit comprising a closure adapted to fit the periphery of its respective opening in sealed relation with the body, and a conduit which extends through the closure from the surface thereof which normally faces outwardly with respect to the interior of the body, then along the inwardly-facing surface of the closure to provide a heat-exchanging section of desired length, and finally back through the closure portion to the outwardly-facing side of the closure. The connection with the inlet portion and the outlet portion of the heat-transfer tube of each unit may thus be made exteriorly of the body. In a preferred embodiment, the hollow body is elongate in the manner of a tube and the openings are disposed in series relationship lengthwise of the body, in approximately the same direction from the longitudinal axis of the body.

Figure 1:
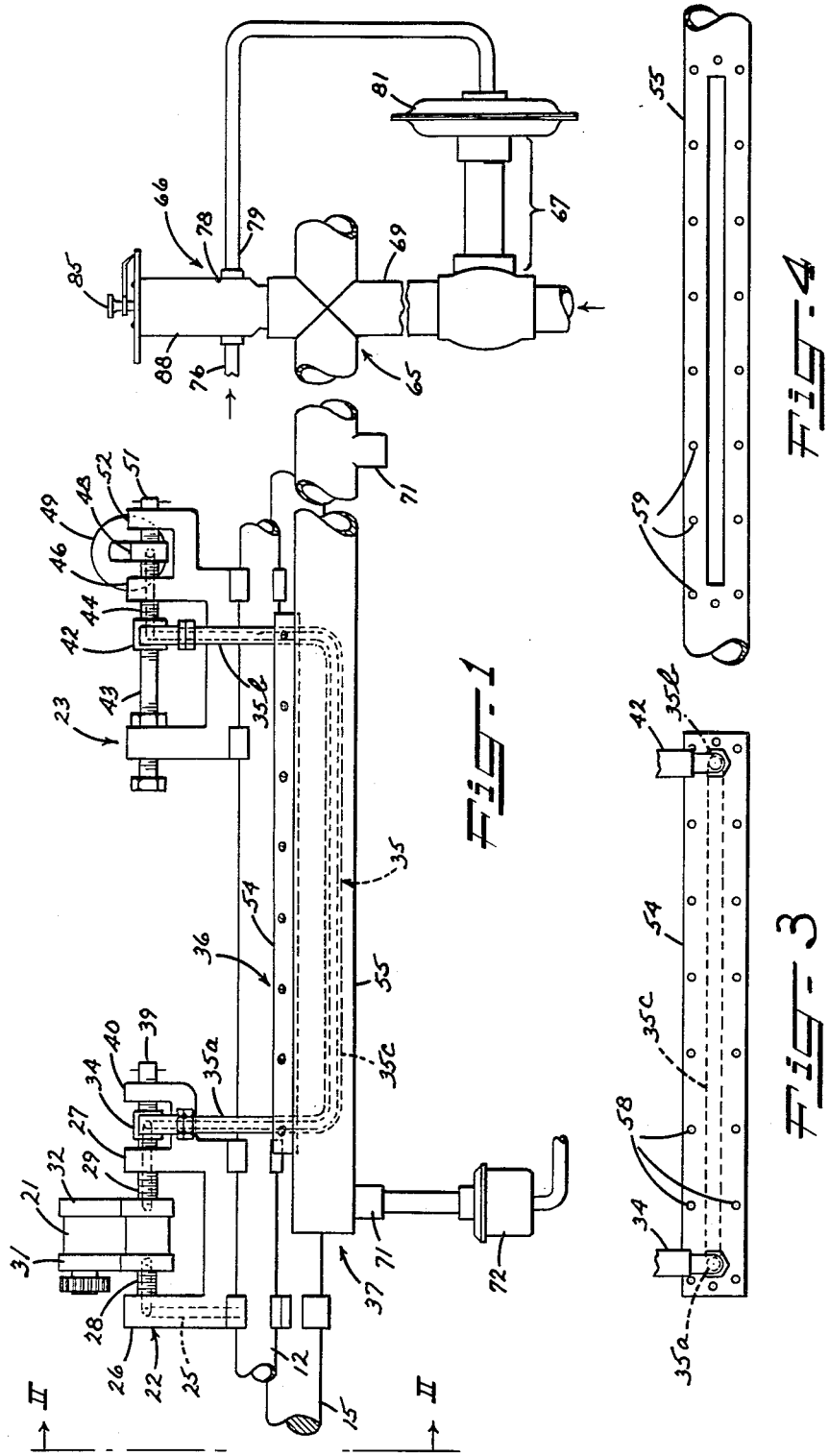
Figure 2:
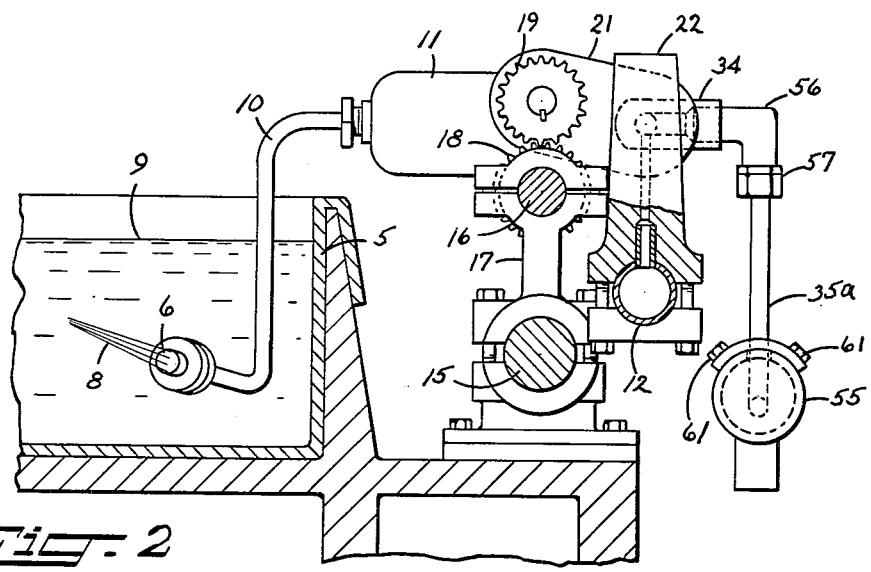
Fig. 2 is a section taken along line II—II of Fig. 1, with portions of the spinning apparatus added.

The present invention is readily applicable to machines for spinning viscose yarn of a type in extensive use and is described by way of example with respect to a conventional multiple-spinneret machine of which portions are shown in Figs. 1 and 2. Fig. 2 illustrates, in cross section, a spinning trough 5 in which a spinneret 6 is positioned for extruding fine streams of viscose into a bath of a coagulating liquid maintained at a level 9 to thus spin a yarn 8. Viscose is supplied to the spinneret 6 through a tube 10 and a candle filter 11 from a viscose supply header 12 through a number of elements to be hereinafter described in detail.

An aligning rod 15 extends lengthwise of the machine and constitutes a basic frame member of the machine relative to which the pump drive shaft 16 and the header 12 are supported by a plurality of spaced aligning brackets 17. The drive shaft 16 has mounted thereon a plurality of spaced gears 18, each of such gears engaging the gear 19 of a pump 21 pivotally supported at each spinning station by a saddle bracket 22. Another saddle bracket 23, which may be of a size and shape identical to that of the bracket 22, is provided at each spinning station. Both brackets are clamped to the viscose supply header 12, with the bracket 22 having a passageway 25 extending through the left-most portion 26 of the bracket, as viewed in Fig. 1, and is in registry with an aperture through the lateral wall of the header, thus placing the passageway 25 in communication with the interior of the supply header 12.

The pump 21 is supported between lugs 26 and 27 of the saddle bracket 22 by hollow threaded elements 28 and 29 having rounded end surfaces which may be adjusted into engagement with shallow recess surfaces of side-portions 31 and 32 of the pump. The pump 21 is of the double-gear type in widespread use within the rayon spinning industry which has side portions drilled in the lengthwise direction to provide inlet and exhaust passageways for the gear chamber contiguous with the recesses engaged by the elements 28 and 29. Element 29 extends in threaded relationship with the lug 27 into engagement with a recessed side surface 33 of the connector 34, which constitutes one terminus of the duct or conduit 35 of the removable unit 36 of the heat exchanger 37. An opposite side surface 38 of the connector 34, in coaxial relationship with the recess engaged by the element 29, is engaged by a set screw 39 which extends through and is threaded with, the lug 40 of the saddle bracket 22. The other terminus for the duct 35 comprises a connector 42 similar to the connector 34. One side of the connector 42 is engaged by a bolt 43 and its opposite side has a shallow recessed surface engaged by the hollow exteriorly-threaded element 44 which extends through the lug member 46 of the saddle bracket 23 into engagement with the recessed side surface of an extension 48 of a conventional candle filter 49. A set screw 51 extends through the lug 52 of the saddle bracket and engages the side surface of the filter extension 48. The side of the extension 48, engaged by the hollow threaded element 44, has a passageway which connects the passageway of the connector 42 with that extending lengthwise through the extension 48 into the body of the filter. The filter is connected with the spinneret by the tube 10, thus completing the path of viscose from the header 12 to the spinneret 6.

Referring now in detail to the structure of the heat exchanger 37, it will be noted that the unit 36 comprises the U-shaped duct 35, and a cap or closure 54 through which legs 35a and 35b of the duct extend with their ends disposed outwardly from the external surface of the cap. The connective section 35c of the duct 35 which joins the legs is disposed interiorly of the steam header 55 when the unit 36 is secured thereto. The cap 54 may be joined as illustrated in the drawing, that is, by marginal portions thereof extending along its entire periphery in overlapping relationship with any one of the elongate apertures of the header 55 provided for receiving the inner connective section 35c of the duct 35. The overlapping portions of the cap 54 and the header have superposed apertures 58 and 59, with the apertures 59 of the header being threaded to receive cap screws 61 which are used to tighten the unit 36 in sealed relationship with the header. A gasket of thin resilient material is normally placed between the overlapping portions of the cap and the header to assure that no leaks will occur.

According to the arrangement of the apparatus illustrated, the longitudinal axis of the steam header 55 is generally parallel to the clamping axis of the saddle brackets along which the connectors 34 and 42 of the exchanger unit 36 are secured. Although the unit 36 may be constructed with the legs of the duct 35 extending out of the header directly toward the clamping axis, the unit is preferably constructed with the connectors 34 and 42 extending transversely to the longitudinal direction of the tube legs 35a and 35b to facilitate attachment of the connectors to the saddle brackets 22 and 23 along the clamping axes thereof, especially when the closure is bolted down tightly on the header. The latter arrangement (as shown) also renders the cap screws 61 somewhat more accessible within the fully assembled spinning machine thus making the removal of the units of the header more convenient. The connectors 34 and 42, and the respective elbow fittings with which they are connected (see fitting 56), provide substantially right-angle bends at the end portions of the duct 35 for each exchanger unit. A slight misalignment of either of the legs of such a duct may thus be corrected after the closure 54 is tightly secured by springing a misaligned leg so as to allow the connector (34 or 42) thereof to position correctly with respect to the adjacent clamping elements of the saddle bracket. The connectors have internally-threaded portions in threaded relationship with externally-threaded portions of the elbows (see elbow 56). The end portions of the tubes 35 extend within jam nuts, such as nut 57 in threaded relation with the elbow 56.

The header 55 may be conveniently constructed of pipe of standard sizes. The caps 54 may be cut also from standard pipe. As one combination of sizes found satisfactory and requiring substantially no reforming, the header 55 is constructed of 1½ inch standard pipe and the caps 54 are cut from 2 inch extra-heavy pipe. The inner surface of each cap 54 is machined to provide a smooth surface conforming to the outer contour of the header of 1½ inch pipe.

Figure 7:
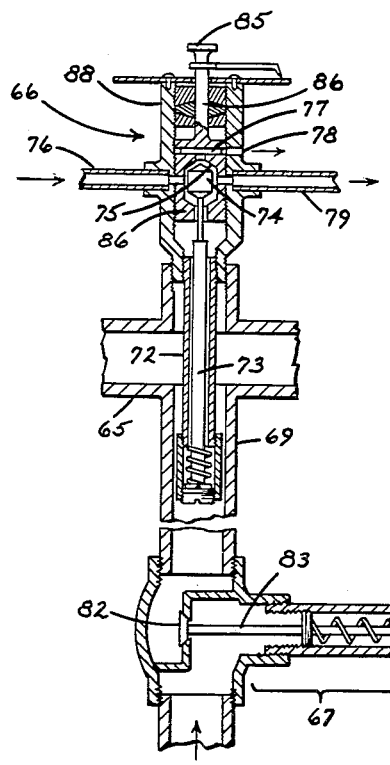
Fig. 7 is a fragmentary sectional view of the pressure-regulating portion of the heat exchanger.
Figure 5:
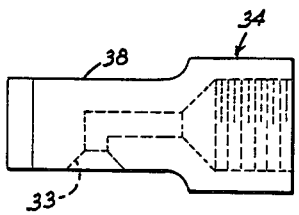
Fig. 5 illustrates a connector of the type used as termini of the viscose-conducting portion of the heat exchanging unit.
Figure 6:
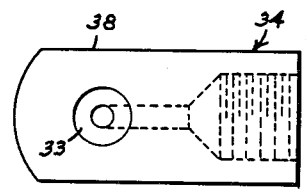
Fig. 6 is another view of the connector as seen at right angles to the plane of Fig. 5.

According to a preferred construction, there is disposed, about midway of the length of the header, a cross fitting 65, into one leg of which is inserted a controller 66 which opens and closes a diaphragm-controlled valve 67. The heat-sensitive section 72, 73 (Fig. 7) of the controller extends through the central section of the cross fitting into the opposing leg 69 thereof through which steam enters the right and left header sections from the valve 67. The header is provided with internally-threaded pipe connections 71 to which may be attached steam traps 72 at intervals along the length of the header.

The controller 66 is conventional in design and comprises a tube 72 having a relatively high coefficient of expansion as compared with a rod 73 comprising a different material. The difference in the linear expansion of the rod and the tube produces movement of the valve element 74 toward and away from its seat at 75 thereby controlling the passage of air supplied to the controller through the tube 76 through a passageway 77 and an air-leak port 78. As the valve element approaches its seat 75, less air leaks from the device and more passes through a tube 79 which conducts air to the chamber 81 of the diaphragm motor of the valve 67. Thus, as the temperature of the steam drops within the header or the cross fitting 65 below the temperature to which the controller is adjusted to maintain, the element 74 tends to seat and increase the flow of air to the diaphragm which thereupon forces (by a push rod 83) the valve member 82 away from its seat and steam thereupon rushes into the header to raise the temperature. The controller acts within the 2 or 3 seconds following the temperature rise accompanying the increase in steam pressure within the header to shut the valve 67. The control temperature within the header may be changed by turning the knob 85 fixed to the internal member 86 of the controller. The external surface of the member 86 engages the inner wall surface of the controller in threaded relationship whereby the member 86, when turned, is adjusted upwardly or downwardly within the outer casing 88 of the controller to change the position of the seat 75 with respect to the element 74.

It will be noted, that positioning the heat responsive valve means approximately midway of the header 55 permits the fluid flowing through each of the ducts 35, which are connected in longitudinally spaced relationship to the header 55 in a manner as shown in Fig. 1, to receive approximately equal amounts of heat from the fluid passing through the header.

While a preferred embodiment of the invention has been shown and described, it is to be understood that changes and variations may be made without departing from the spirit and scope of the invention as defined in the appended claim.

I claim:

A heat exchange system including an elongated fluid conveying member having outlet means at its opposite ends, at least two longitudinally spaced elongated openings extending through a wall of said member, a cover for each of said openings detachably secured to said member, a conduit carried by each of said covers, each of said conduits including a central portion positioned within and extending longitudinally and substantially axially of said member and end portions serving as inlet and outlet means extending through its respective cover, and a heat responsive valve means connected to said member intermediate said openings for admitting fluid therein whereby heat transfer between fluids passing through said member and conduits occurs in the areas of said central portions.

References Cited in the file of this patent

UNITED STATES PATENTS

| | | |
|---|---|---|
| 1,527,273 | Riehm | Feb. 24, 1925 |
| 1,742,329 | Ullman | Jan. 7, 1930 |
| 1,818,343 | Monroe | Aug. 11, 1931 |
| 2,228,955 | Heath | Jan. 14, 1941 |
| 2,302,008 | Dunn | Nov. 17, 1942 |
| 2,322,284 | De Wald | June 22, 1943 |
| 2,372,502 | Lehane et al. | Mar. 27, 1945 |
| 2,611,925 | Merion et al. | Sept. 30, 1952 |